(12) United States Patent
Hoshina et al.

(10) Patent No.: US 7,812,721 B2
(45) Date of Patent: Oct. 12, 2010

(54) SENSOR PROTECTOR

(75) Inventors: Masaru Hoshina, Toyota (JP); Hironori Koeda, Gifu (JP); Dalsuke Kudo, Kasugai (JP); Youji Orimoto, Hatsukaichi (JP)

(73) Assignees: Aisin Seiki Kabushiki Kaisha, Kariya-Shi, Aichi-Ken (JP); Nishikawa Rubber Co., Ltd., Hiroshima-Shi, Hiroshima (JP)

( * ) Notice: Subject to any disclaimer, the term of this patent is extended or adjusted under 35 U.S.C. 154(b) by 298 days.

(21) Appl. No.: 12/167,699

(22) Filed: Jul. 3, 2008

(65) Prior Publication Data
US 2009/0009325 A1    Jan. 8, 2009

(30) Foreign Application Priority Data
Jul. 5, 2007  (JP) .............................. 2007-177150
Jun. 11, 2008  (JP) .............................. 2008-152758

(51) Int. Cl.
G08B 21/00    (2006.01)

(52) U.S. Cl. ................. 340/540; 340/545.1; 340/545.3; 340/545.8; 29/897.312; 49/26; 49/502; 49/504

(58) Field of Classification Search ................. 340/540, 340/544, 545.1, 545.3, 545.7, 545.8, 551, 340/552; 49/26, 28, 501, 502, 504; 29/897.2, 29/897.212; 318/445, 466, 480
See application file for complete search history.

(56) References Cited

U.S. PATENT DOCUMENTS

| 4,884,370 | A  | * | 12/1989 | Nozaki et al. | .............. 49/479.1 |
| 4,910,918 | A  | * | 3/1990  | Naples et al. | ................. 49/441 |
| 5,269,101 | A  | * | 12/1993 | Nozaki et al. | .............. 49/479.1 |
| 6,273,433 | B1 | * | 8/2001  | Yu | ............................. 277/629 |
| 6,297,605 | B1 | * | 10/2001 | Butler et al. | ................. 318/466 |
| 6,339,305 | B1 | * | 1/2002  | Ishihara et al. | .............. 318/445 |
| 6,393,766 | B2 | * | 5/2002  | Nozaki et al. | .............. 49/498.1 |
| 6,750,624 | B2 | * | 6/2004  | Haag et al. | .................. 318/467 |
| 6,836,209 | B2 | * | 12/2004 | Ploucha | ..................... 340/435 |
| 6,925,755 | B1 | * | 8/2005  | Kyrtsos | ......................... 49/26 |
| 6,936,320 | B2 | * | 8/2005  | Kubo et al. | ................. 428/36.9 |
| 7,000,352 | B2 | * | 2/2006  | Ishihara et al. | ................. 49/28 |
| 7,135,216 | B2 | * | 11/2006 | Tsujiguchi | .................. 428/122 |
| 7,219,945 | B1 | * | 5/2007  | Zinn et al. | .................... 296/56 |

(Continued)

FOREIGN PATENT DOCUMENTS

JP    2004-176426 A    6/2004

*Primary Examiner*—Davetta W Goins
(74) *Attorney, Agent, or Firm*—Buchanan Ingersoll & Rooney PC

(57) ABSTRACT

A sensor protector adapted to be attached to either a body or a door of a vehicle includes a hollow portion for accommodating a touch sensor for sensing whether or not an object exists between the body and the door of the vehicle, an attaching base portion formed as a unit with the hollow portion and including a core material embedded therein, a recessed portion provided at the attaching base portion having a rectangular shape formed by cutting out the attaching base portion, plural block-shaped cover portions formed contiguously with respective cut surfaces of the attaching base portion for covering the respective cut surfaces, and mating plates provided at two cover portions formed contiguously with respective visible front walls of the attaching base portion, the mating plates having facing mating edges which mate together when the sensor protector is bent.

6 Claims, 13 Drawing Sheets

U.S. PATENT DOCUMENTS 7,320,497 B2 * 1/2008 Zinn et al. ............... 296/146.4
7,504,943 B2 * 3/2009 Takeuchi et al. ......... 340/545.1
7,528,703 B2 * 5/2009 Touge ....................... 340/435
2007/0273545 A1 11/2007 Hoshina et al.

* cited by examiner

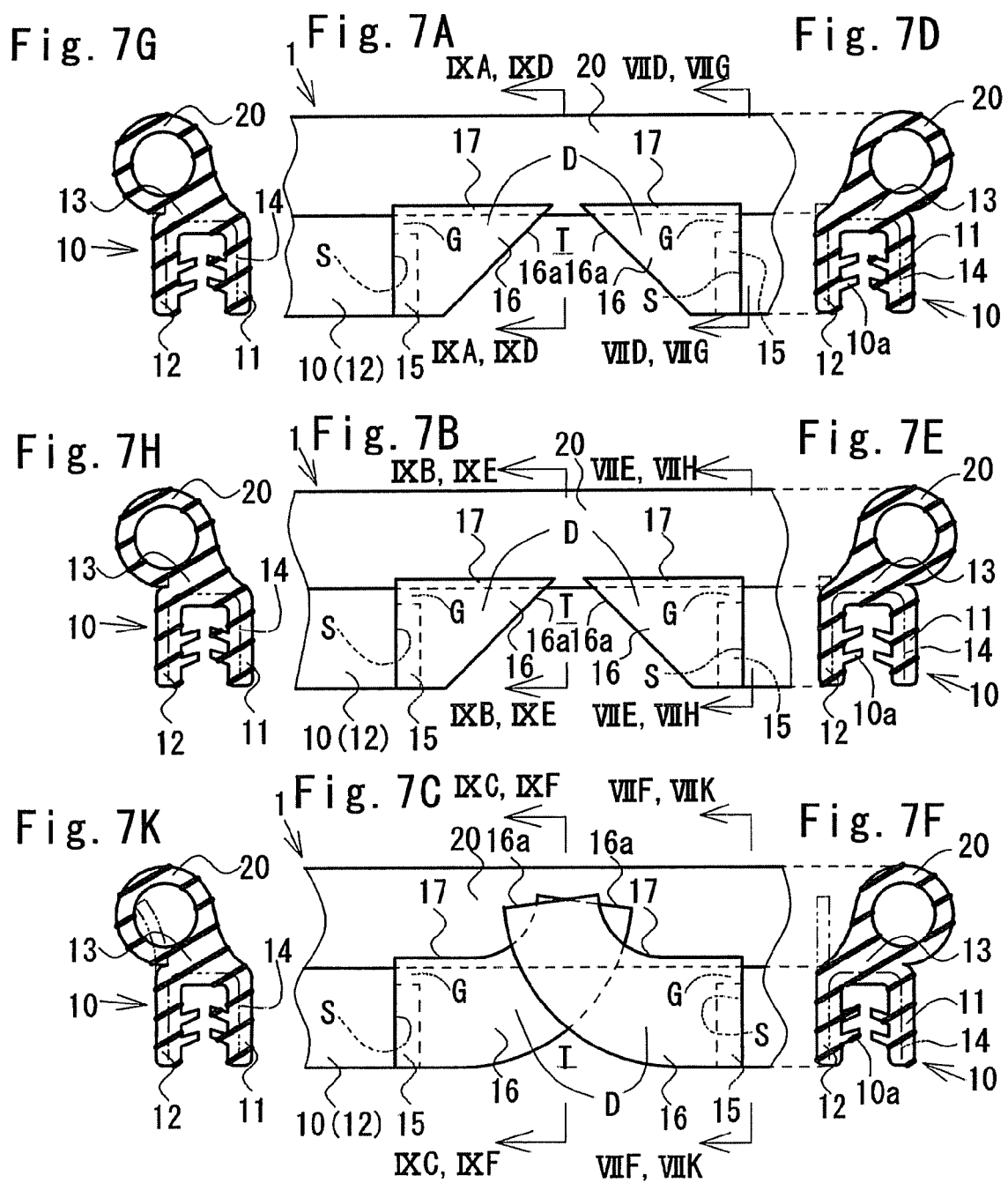

1

SENSOR PROTECTOR

CROSS REFERENCE TO RELATED APPLICATIONS

This application is based on and claims priority under 35 U.S.C. §119 to Japanese Patent Application 2007-177150, filed on Jul. 5, 2007, and Japanese Patent Application 2008-152758, filed on Jun. 11, 2008, the entire contents of which is incorporated herein by reference.

FIELD OF THE INVENTION

The present invention relates to a sensor protector for accommodating a touch sensor.

BACKGROUND

A touch sensor is attached, for example, to a door such as a back door of an automatic pivoting type or a side door of an automatic sliding type of a vehicle. The touch sensor senses a finger, or the like, caught between the door and a body of the vehicle.

The touch sensor is attached to the door through a sensor protector for accommodating the touch sensor. The sensor protector includes an attaching base portion in which a core metal is embedded and a hollow portion for accommodating the touch sensor. A cross-sectional shape of the attaching base portion is an approximate U-shape. The hollow portion is formed as a unit with the attaching base portion. The sensor protector is attached to a flange member protruding from the door through a hook portion of the attaching base portion.

The touch sensor described above is normally provided along an edge of the door. However, the core material embedded in the sensor protector for accommodating the touch sensor hinders the sensor protector to be bent. Therefore, it tends to be difficult to provide the touch sensor along the edge of the door at a corner portion of the door. As a result, sensing accuracy of the touch sensor tends to degrade at the corner portion of the door.

Further, if the sensor protector is forcibly bent to provide the touch sensor along the corner portion of the door, there is a concern that the core material of the sensor protector may break. As a result, a broken part of the core material of the sensor protector will be affected by rust, or the like. Therefore, appearance of the sensor protector degrades.

For example, a sensor protector described in JP2004-176426A is known. The sensor protector includes a pressing member provided at a section corresponding to an angular section of a tail gate for pressing a touch sensor. Accordingly, though the touch sensor is not provided along an edge of the tail gate at the angular section, detection accuracy of the touch sensor at the angular section of the tail gate can be ensured by the pressing member. However, the sensor protector needs a separate pressing member.

A need thus exists for a sensor protector which is not susceptible to the drawback mentioned above.

SUMMARY OF THE INVENTION

According to an aspect of the present invention, a sensor protector adapted to be attached to either a body or a door of a vehicle includes a hollow portion for accommodating a touch sensor for sensing whether or not an object exists between the body and the door of the vehicle, an attaching base portion formed as a unit with the hollow portion and including a core material embedded therein, a recessed portion provided at the attaching base portion having a rectangular shape formed by cutting out the attaching base portion, plural block-shaped cover portions formed contiguously with respective cut surfaces of the attaching base portion for covering the respective cut surfaces, and mating plates provided at two cover portions formed contiguously with respective visible front walls of the attaching base portion, the mating plates having facing mating edges which mate together when the sensor protector is bent.

BRIEF DESCRIPTION OF THE DRAWINGS

The foregoing and additional features and characteristics of the present invention will become more apparent from the following detailed description considered with the reference to the accompanying drawings, wherein:

FIG. 7A is a front view illustrating a visible front side of the sensor protector according to the first embodiment of the present invention, in a state before the sensor protector is bent, the sensor protector having trapezoidal mating members;

FIG. 7B is a front view illustrating a visible front side of the sensor protector according to the first embodiment of the present invention, in a state before the sensor protector is bent, the sensor protector having approximate right-triangle-shaped mating members;

FIG. 7C is a front view illustrating a visible front side of the sensor protector according to the first embodiment of the present invention, in a state before the sensor protector is bent. The sensor protector is designed to be bent so that a radius of curvature of the hollow portion of the sensor protector is smaller than that of the attaching base portion;

FIG. 7D is a cross-sectional view illustrating the sensor protector designed to be attached to the body, taken along line VIID-VIID in FIG. 7A;

FIG. 7E is a cross-sectional view illustrating the sensor protector designed to be attached to the body, taken along line VIIE-VIIE in FIG. 7B;

FIG. 7F is a cross-sectional view illustrating the sensor protector designed to be attached to the body, taken along line VIIF-VIIF in FIG. 7C;

FIG. 7G is a cross-sectional view illustrating the sensor protector designed to be attached to the door, taken along line VIIG-VIIG in FIG. 7A;

FIG. 7H is a cross-sectional view illustrating the sensor protector designed to be attached to the door, taken along line VIIH-VIIH in FIG. 7B;

FIG. 7K is a cross-sectional view illustrating the sensor protector designed to be attached to the door, taken along line VIIK-VIIK in FIG. 7C;

DETAILED DESCRIPTION

Figure 1:
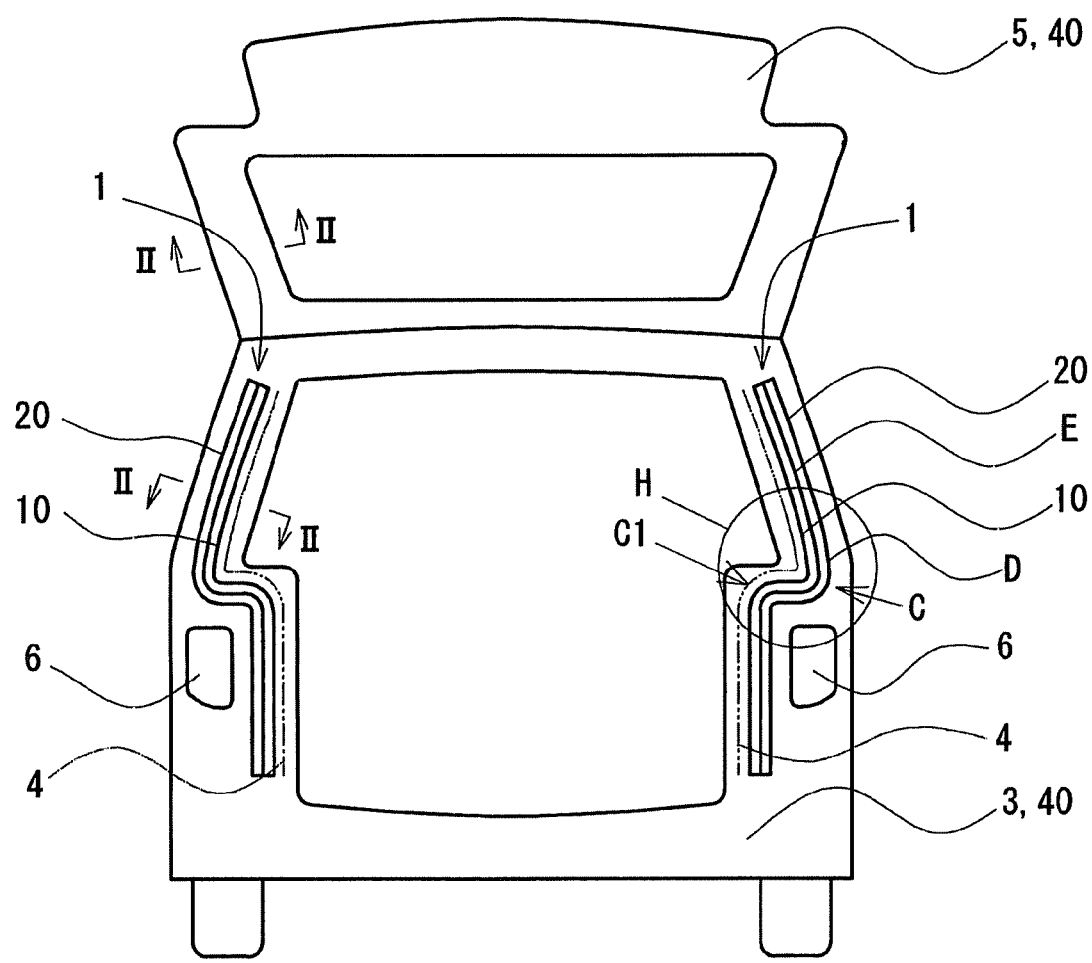
FIG. 1 is a rear view illustrating a vehicle including a back door which opens upward and a body to which a sensor protector is attached.
Figure 2:
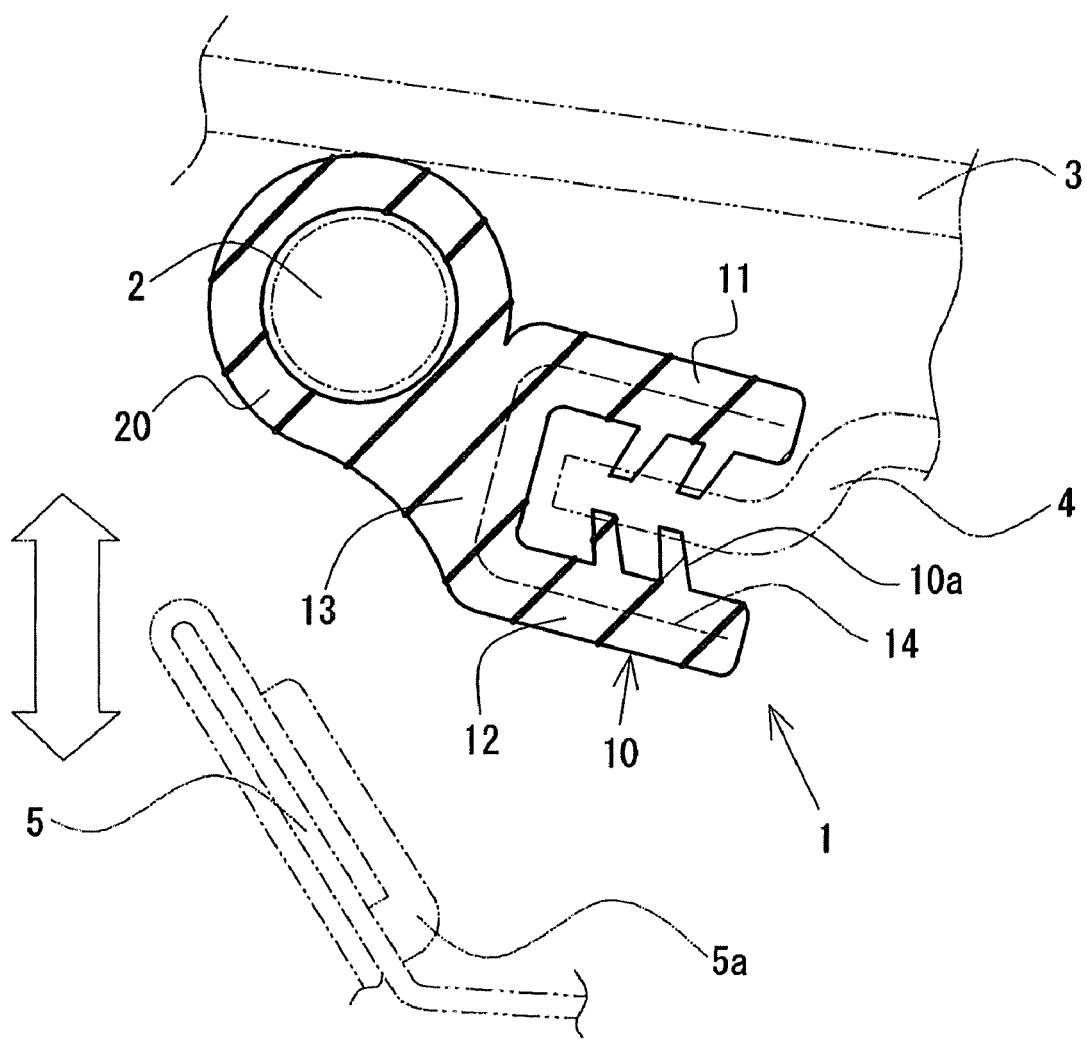
FIG. 2 is a cross-sectional view illustrating a situation immediately before the back door is entirely closed, taken along line II-II in FIG. 1.
Figure 3:
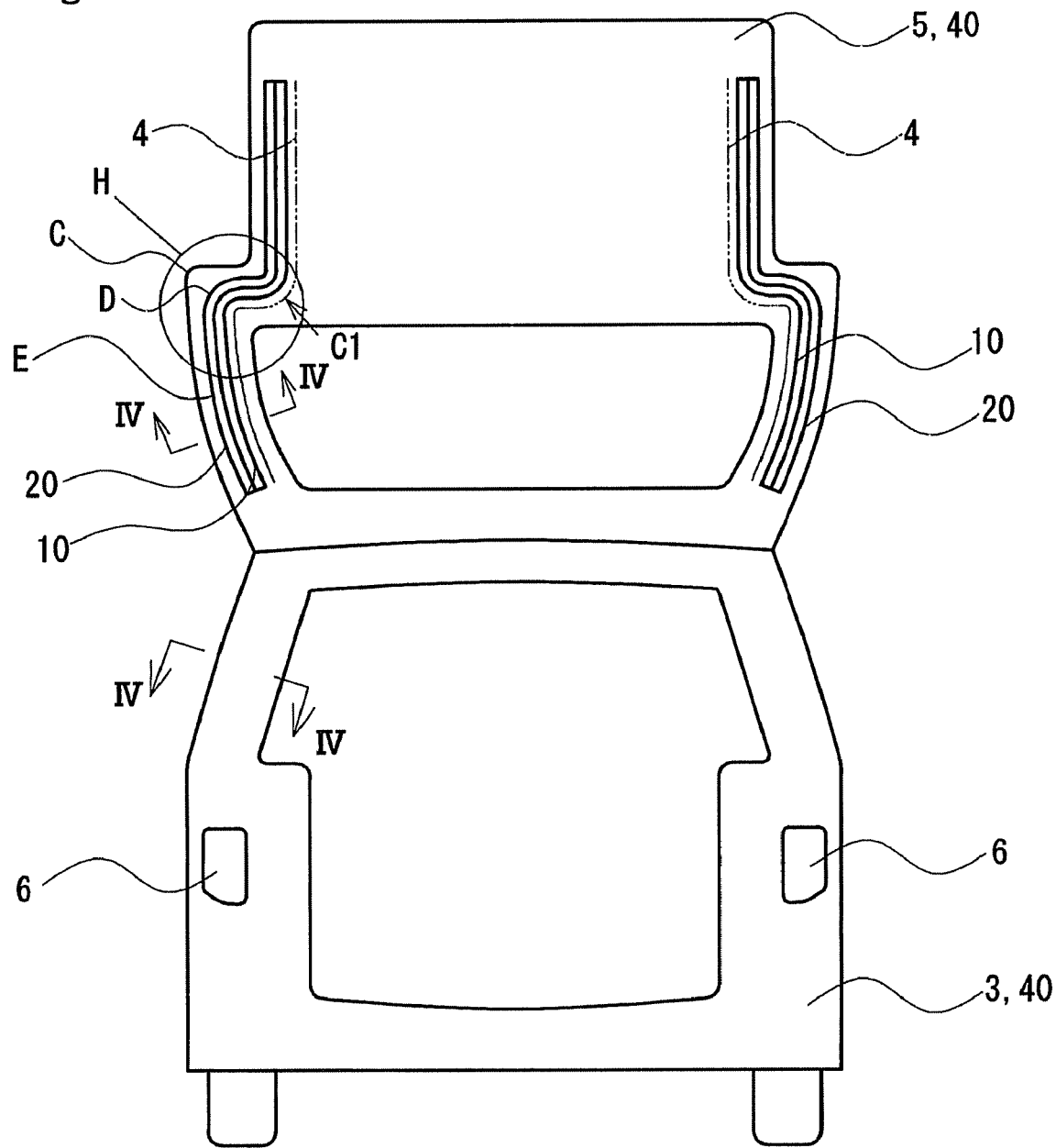
FIG. 3 is a rear view illustrating a vehicle including a back door which opens upward and to which the sensor protector is attached. Here, the back door is illustrated in an expanded manner for explanatory convenience.
Figure 4:
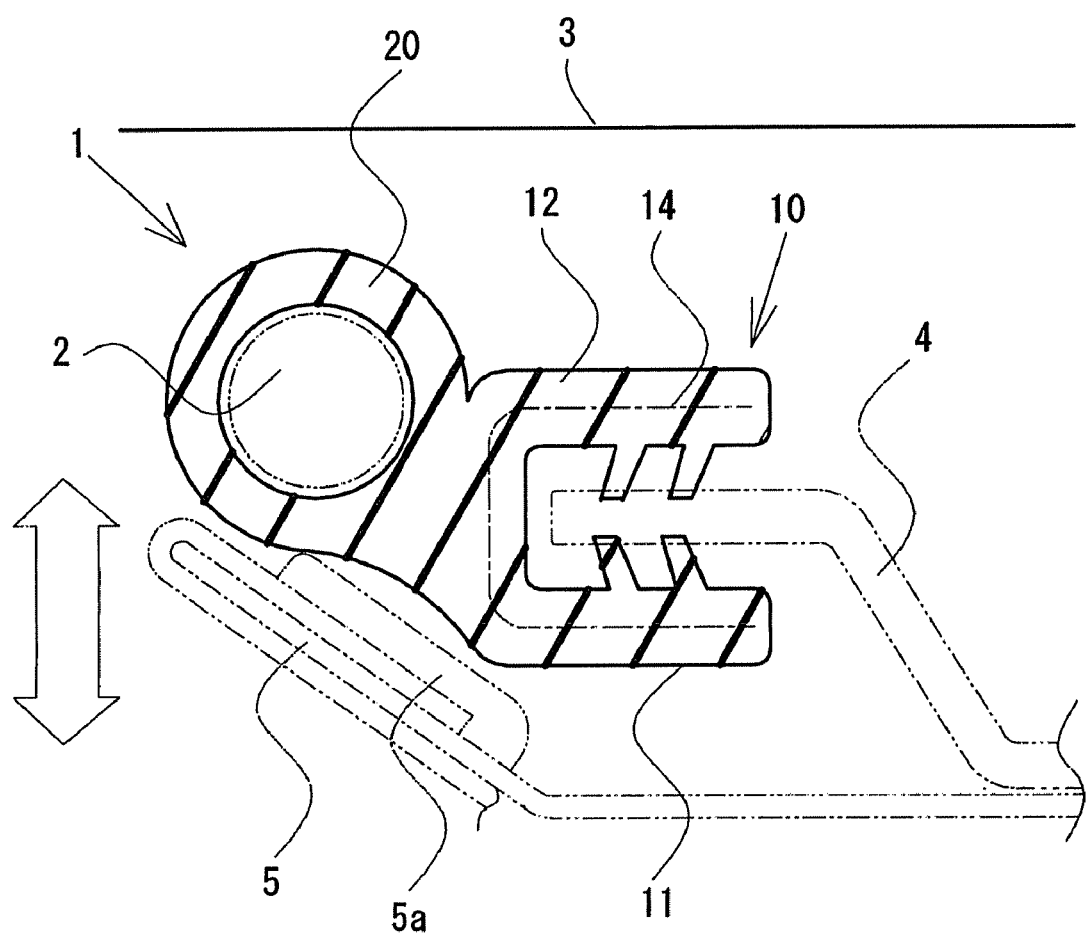
FIG. 4 is a cross-sectional view illustrating a situation immediately before the back door is entirely closed, taken along line IV-IV in FIG. 3.
Figure 5:
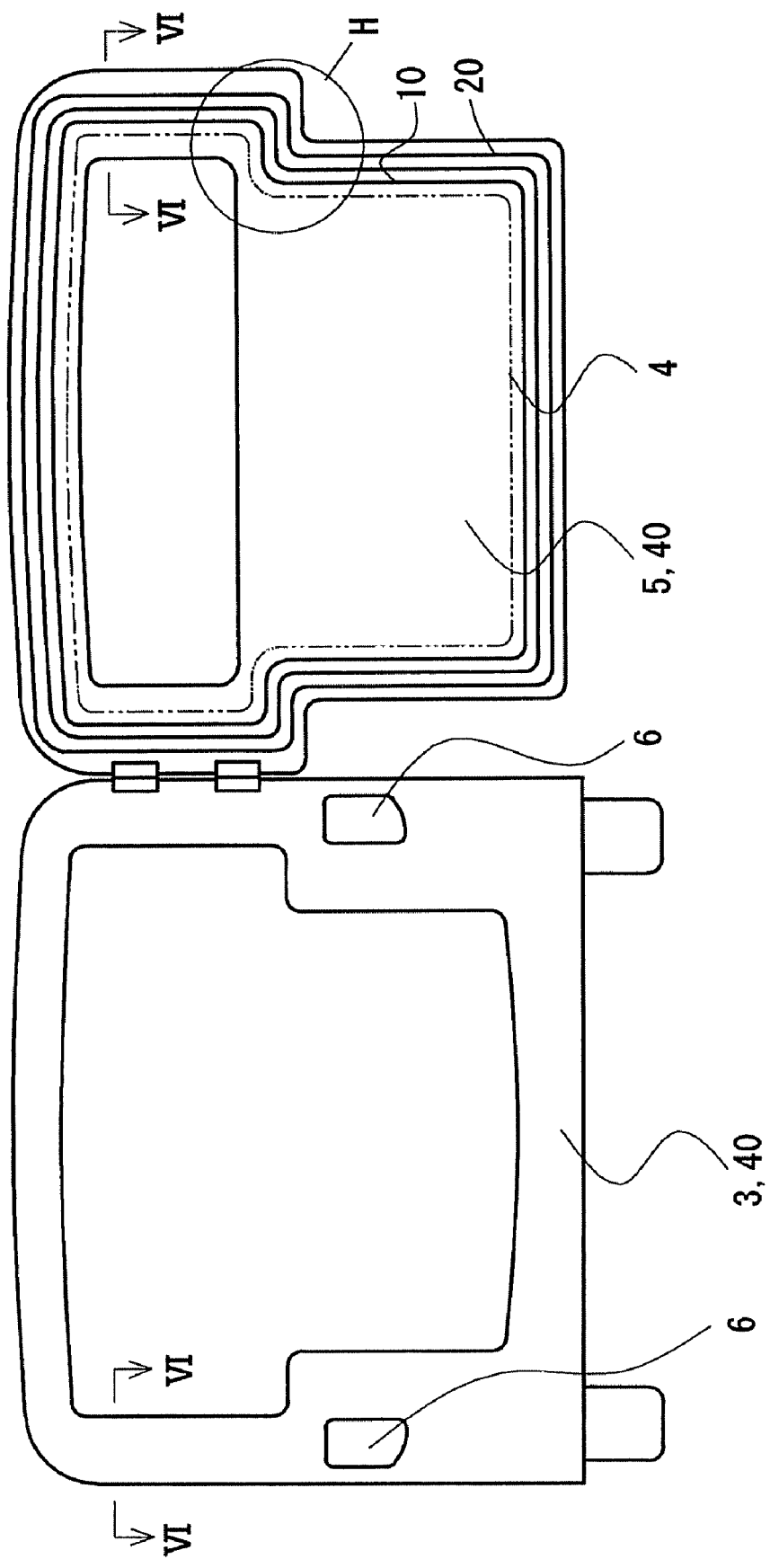
FIG. 5 is a rear view illustrating a vehicle including a back door which opens to a right side and to which the sensor protector is attached.
Figure 6:
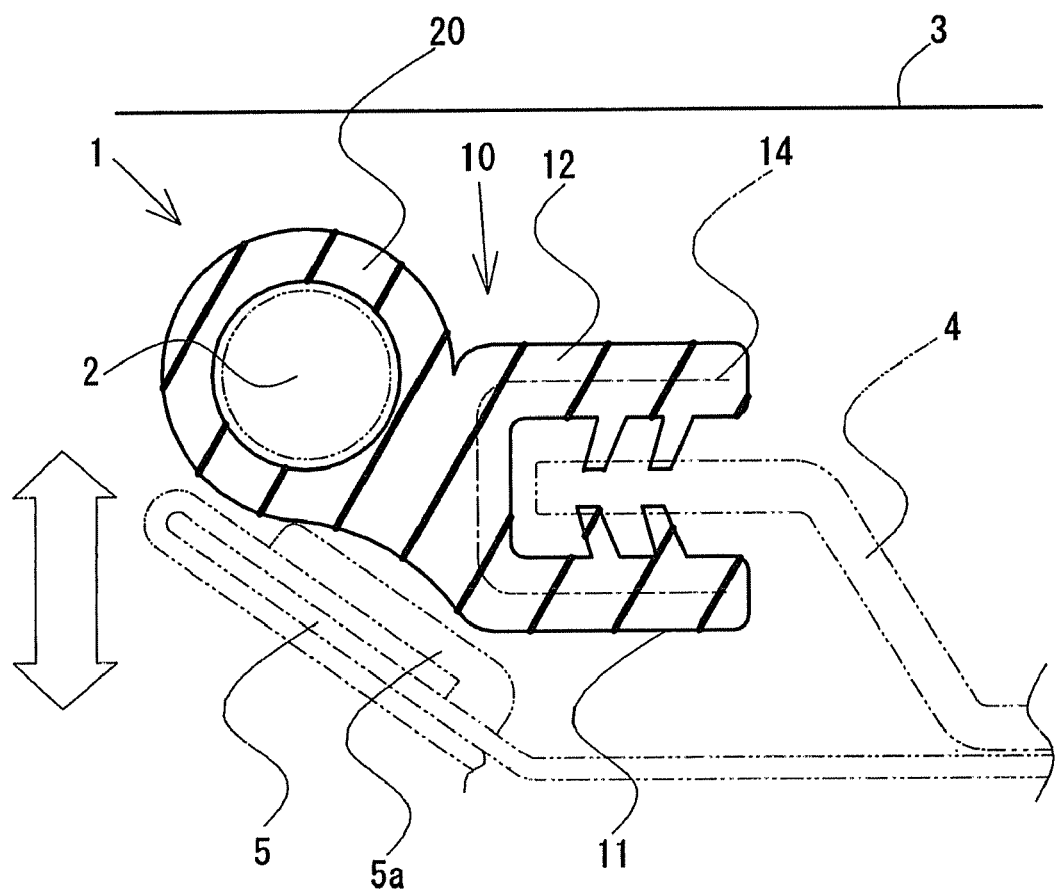
FIG. 6 is a cross-sectional view illustrating a situation immediately before the back door is entirely closed, taken along line VI-VI in FIG. 5.

A sensor protector 1 according to a first embodiment of the present invention will be explained with reference to FIGS. 1, 2, 7 to 13. In the first embodiment, the sensor protector 1 is provided at a body 3 of a vehicle 40. The vehicle 40 includes a back door 5. An upper end portion of the back door 5 is connected to the body 3 of the vehicle 40 through a horizontal hinge so that the back door 5 pivots up and down automatically. The sensor protector 1 is attached to the body 3, to which the back door 5 is attached. The sensor protector 1 accommodates a touch sensor 2 for sensing an object such as a finger or a hand of a child caught (exist) between a body panel of the body 3 and the back door 5.

The sensor protector 1 includes an extruded portion E. The extruded portion E includes a hollow portion 20 for accommodating the touch sensor 2 and an attaching base portion 10 formed as a unit with the hollow portion 20. A cross-sectional shape of the attaching base portion 10 is an approximate U-shape. A core material 14 made of metal (core metal) is embedded in the attaching base portion 10. The core material 14 may be made of resin. The attaching base portion 10 includes a hook portion 10a. The attaching base portion 10 is attached to a flange member 4 of the body 3 through the hook portion 10a.

A recessed portion T is provided at the attaching base portion 10 of the sensor protector 1. A predetermined length of the attaching base portion 10 of the sensor protector 1 is cut out rectangularly to form the recessed portion T having a rectangular shape. The recessed portion T is provided at a part of the attaching base portion 10 of the sensor protector 1 to be attached to a corner portion C. Two cover portions 15 (block-shaped cover portions) of an approximate U-shaped block for covering respective cut surfaces S are formed contiguously with the respective cut surfaces S by molding. At the time of molding, a core M is inserted in the recessed portion T in the vicinity of the hollow portion 20 to form a clearance G between the hollow portion 20 and the cover portion 15.

The cover portions 15 are formed to be contiguously with and to cover respective outer (in terms of the vehicle 40) walls of the attaching base portion 10, in other words, respective visible front walls 12 of the attaching base portion 10, respective inner (in terms of the vehicle 40) walls of the attaching base portion 10, in other words, respective invisible rear walls 11 of the attaching base portion 10, and respective bottom walls 13 of the attaching base portion 10. Portions of the two cover portions 15 contiguous with the respective visible front walls 12 of the attaching base portion 10 are formed to be longer than portions of the cover portions 15 contiguous with the respective invisible rear walls 11 of the attaching base portion 10 and than portions of the cover portions 15 contiguous with the respective bottom walls 13 of the attaching base portion 10 so as to form mating plates 16. When the sensor protector 1 is bent along the corner portion C, facing mating edges 16*a* of the mating plates 16 mate together. The cover portions 15 contiguous with the respective inner walls of the attaching base portion 10, in other words, the invisible rear walls 11 of the attaching base portion 10, may be similarly formed so as to form the mating plates 16. The cover portions 15 contiguous with the respective bottom walls 13 of the attaching base portion 10 may be similarly formed so as to form the mating plates 16.

An extended portion 17 is formed as a unit with the mating plate 16 by molding. The extended portion 17 covers and hides the clearance G. The extended portion 17 is provided contiguously with a visible front wall of the cover portion 15 and extends toward the hollow portion 20 from the mating plate 16. The mating plate 16 has a trapezoidal shape. The mating edges 16*a* form an approximate right angle. The cover portions 15, the mating plates 16 and the extended portions 17 configure a molded portion D. A tail lamp 6 is provided at the body 3 of the vehicle 40. A sealer 5*a* made of urethane is provided at the back door 5.

In the sensor protector 1 according to the first embodiment, at the part of the sensor protector 1 attached along the corner portion C, the cover portions 15 for covering the respective cut surfaces S are formed contiguously with the respective cut surfaces S by molding. Accordingly, the core material 14 embedded in the attaching base portion 10 and exposed from the respective cut surfaces S can be covered by the cover portions 15. Therefore, appearance can be improved. Further, rusting of the core material (core metal) 14 can be inhibited.

Two mating plates 16 are provided contiguously with two cover portions 15 formed contiguously with the respective visible front walls 12 of the attaching base portion 10. When the sensor protector 1 is bent along the corner portion C, the facing mating edges 16*a* of the mating plates 16 mate together. Accordingly, two mating plates 16 can cover the recessed portion T. Therefore, appearance can be improved.

The core material 14 embedded in a part of the attaching base portion 10 corresponding to the recessed portion T can be removed when the recessed portion T is formed at the attaching base portion 10. Accordingly, the sensor protector 1 can be bent preferably along the corner portion C even when a radius of curvature of the corner portion C is small. Further, breakage of the core material 14 can be inhibited. Accordingly, rusting of the core material 14 can be inhibited. Therefore, the sensor protector 1 excels in appearance.

The core M is inserted in the recessed portion T of the attaching base portion 10 in the vicinity of the hollow portion 20 at the time of molding in order to prevent deformation, or the like, of the hollow portion 20 caused by pressure exerted by a molded material. Accordingly, a shape of the hollow portion 20 can remain as it is. Therefore, the hollow portion 20 can preferably accommodate the touch sensor 2.

The clearance G formed by the core M remains to separate the hollow portion 20 and the cover portion 15. Accordingly, the sensor protector 1 can be elastically deformed more easily. Therefore, the sensor protector 1 can be provided along the corner portion C more smoothly.

A narrow clearance G1 is formed between the hollow portion 20 and the extended portion 17. Therefore, the sensor protector 1 can be bent along the corner portion C more easily.

The extended portion 17 for covering the clearance G is formed as a unit with the cover portion 15 and the mating plate 16 by molding. The extended portion 17 is formed contiguously with the visible front wall of the cover portion 15 and extends toward the hollow portion 20 from the mating plate 16. Accordingly, when the sensor protector 1 is attached along the corner portion C, the extended portion 17 inhibits the body panel of the body 3 to be seen by a user through the clearance G between the hollow portion 20 and the cover portion 15 (refer to FIG. 12A). Therefore, appearance is further improved.

The mating plate 16 has the trapezoidal shape. Two mating edges 16*a* of the mating plates 16 form the approximate right angle. Accordingly, when the sensor protector 1 is bent along the corner portion C smoothly to almost a right angle toward the attaching base portion 10, preferable appearance can be obtained.

Figure 10:
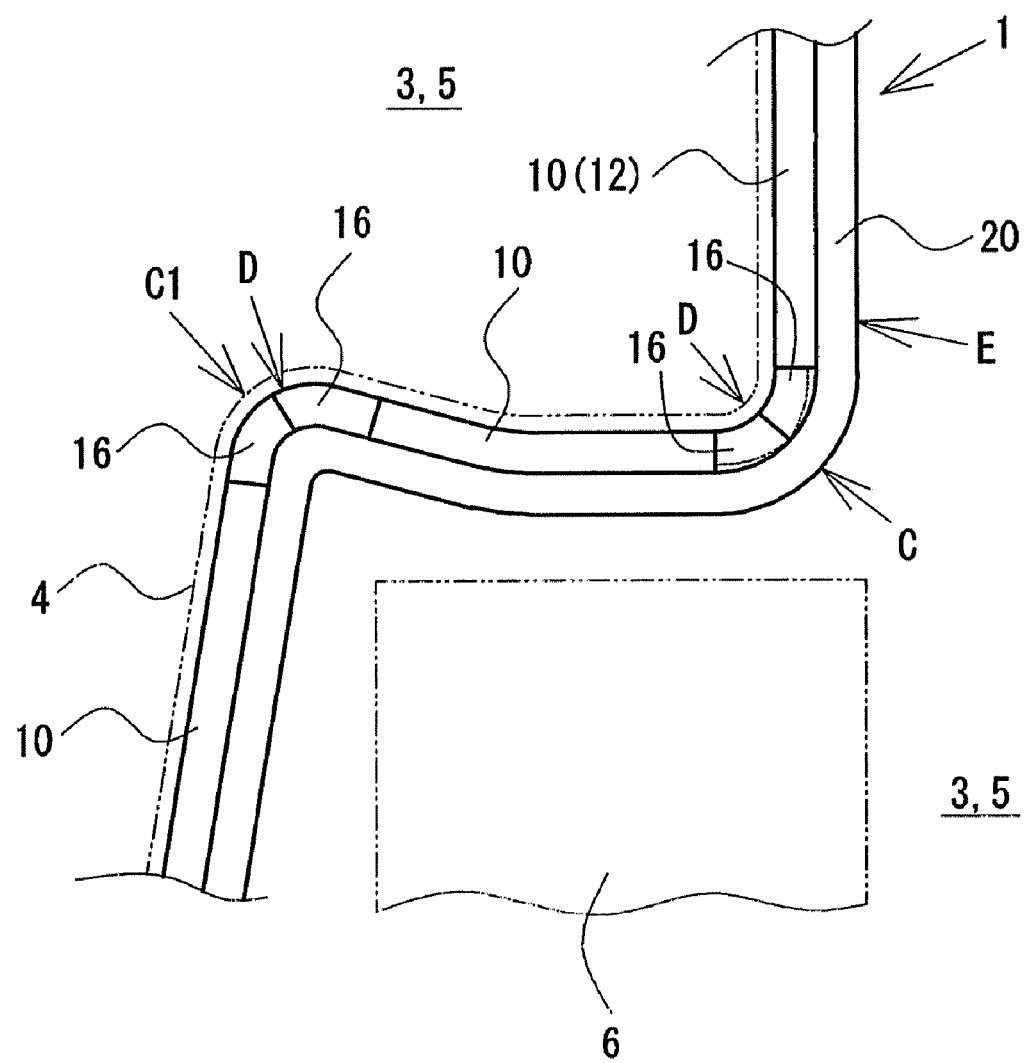
FIG. 10 is an enlarged view of an area H of FIG. 1, FIG. 3 or FIG. 5 illustrating an enlarged rear view of the sensor protector illustrated in FIG. 7A, FIG. 7B or FIG. 7C attached to the body illustrated in FIG. 1 or to the door illustrated in FIG. 3 or FIG. 5.
Figure 11A:
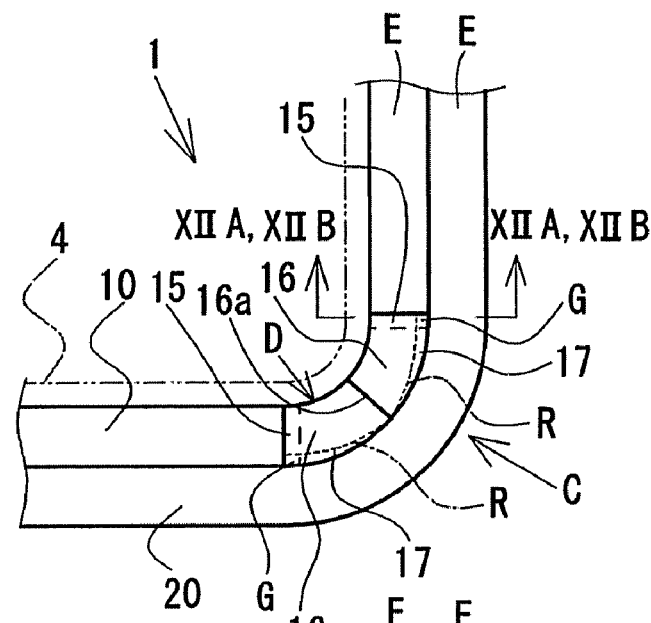
FIG. 11A is an enlarged view illustrating a bent portion of the sensor protector illustrated in FIG. 7A.
Figure 11B:
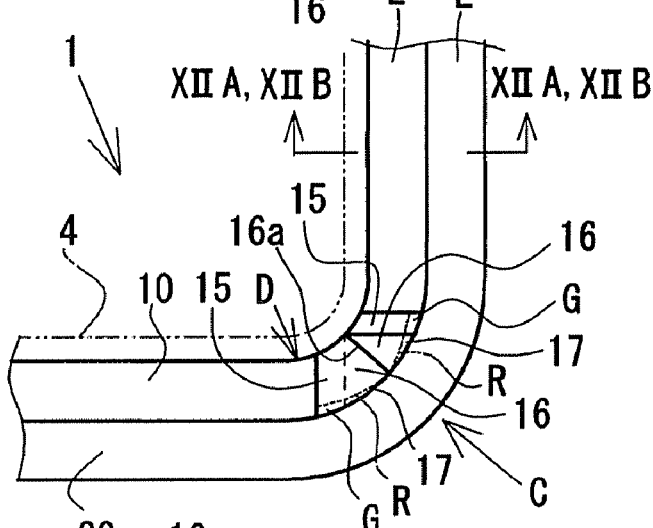
FIG. 11B is an enlarged view illustrating a bent portion of the sensor protector illustrated in FIG. 7B.
Figure 11C:
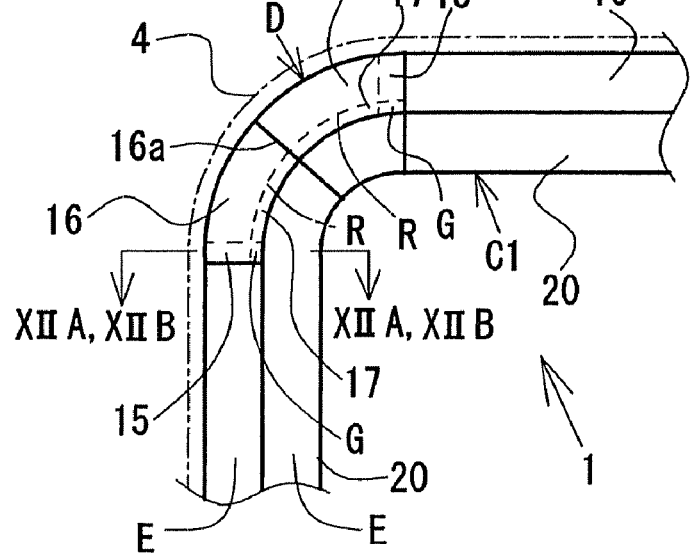
FIG. 11C is an enlarged view illustrating a bent portion of the sensor protector illustrated in FIG. 7C.
Figure 12A:
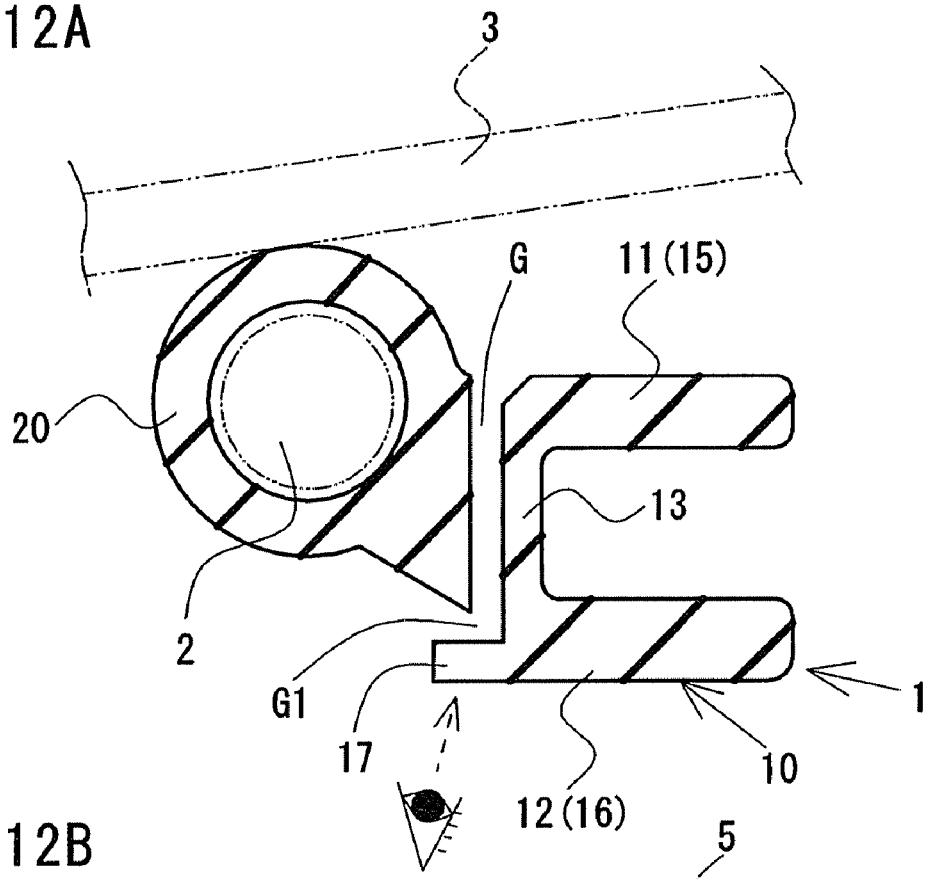
FIG. 12A is a cross-sectional view illustrating the sensor protector attached to the body, taken along line XIIA-XIIA in FIG. 11A, FIG. 11B or FIG. 11C.
Figure 12B:
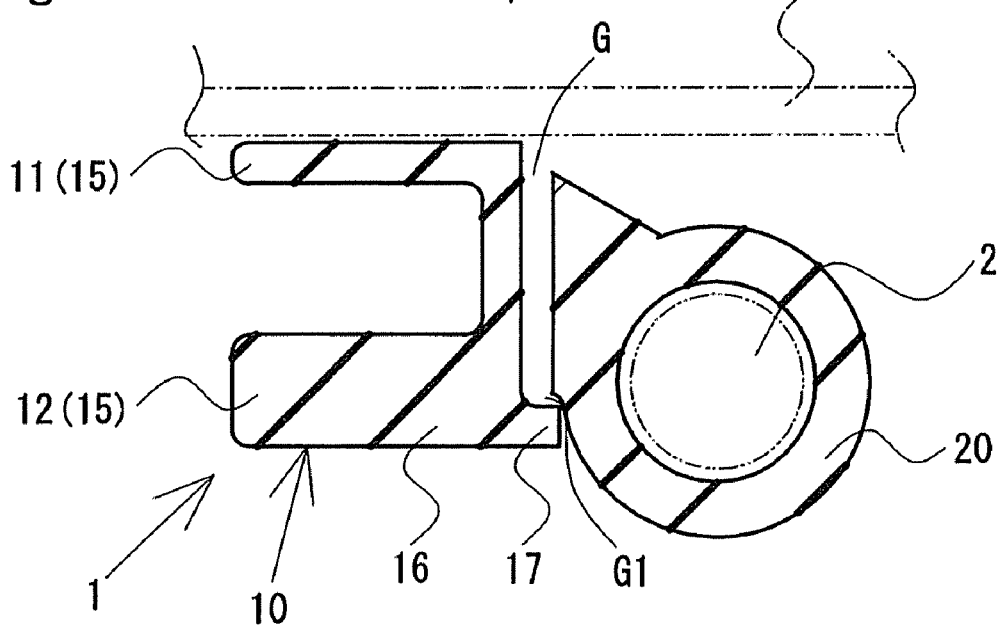
FIG. 12B is a cross-sectional view illustrating the sensor protector attached to the door, taken along line XIIB-XIIB in FIG. 11A, FIG. 11B or FIG. 11C.

In the first embodiment, the mating plate 16 has the trapezoidal shape and the mating edges 16*a* form the approximate right angle so that the sensor protector 1 can be bent to almost the right angle toward the attaching base portion 10 and so that the sensor protector 1 can be provided along the corner portion C. However, a bending direction of the sensor protector 1 is not limited to a direction toward the attaching base portion 10. Accordingly, inversely, as illustrated in FIGS. 10 and 11C, the sensor protector 1 can be bent to almost a right angle toward the hollow portion 20 and the sensor protector 1 can be similarly provided along an inverse corner portion C1. The sensor protector 1 according to the first embodiment of the present invention can be attached to an edge portion of an opening of the back door 5. The sensor protector 1 according to the first embodiment of the present invention can be attached also to an edge portion of an opening of a side door.

Figure 8G:
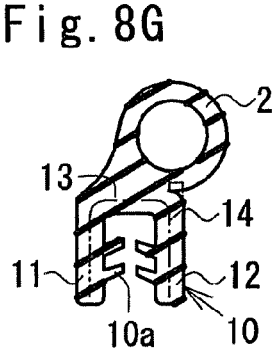
FIG. 8G is a cross-sectional view illustrating the sensor protector designed to be attached to the door, taken along line VIIIG-VIIIG in FIG. 8A.
Figure 8A:
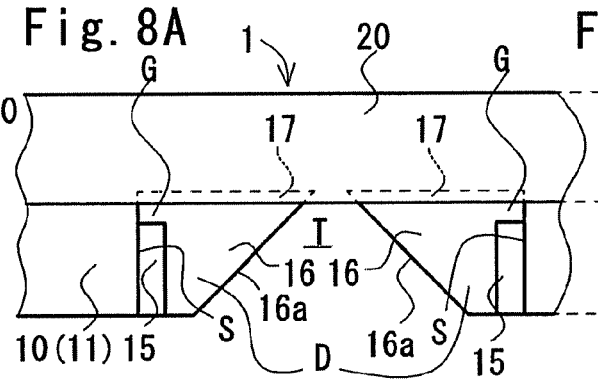
FIG. 8A is a rear view illustrating an invisible rear side of the sensor protector according to the first embodiment of the present invention, in a state before the sensor protector is bent, the sensor protector having the trapezoidal mating members.
Figure 8D:
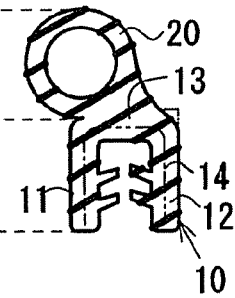
FIG. 8D is a cross-sectional view illustrating the sensor protector designed to be attached to the body, taken along line VIIID-VIIID in FIG. 8A.
Figure 8H:
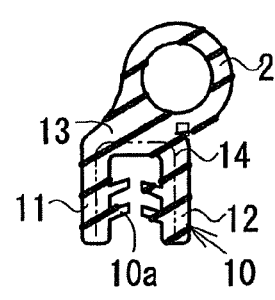
FIG. 8H is a cross-sectional view illustrating the sensor protector designed to be attached to the door, taken along line VIIIH-VIIIH in FIG. 8B.
Figure 8B:
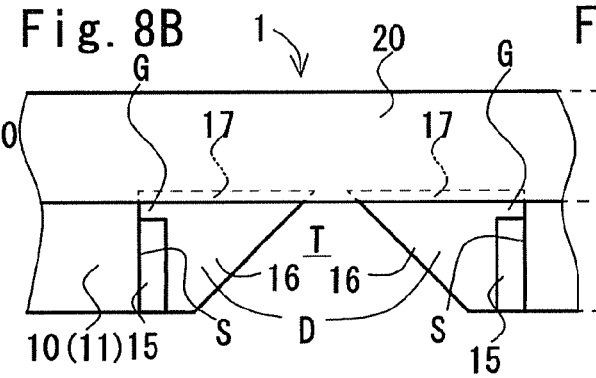
FIG. 8B is a rear view illustrating an invisible rear side of the sensor protector according to the first embodiment of the present invention, in a state before the sensor protector is bent, the sensor protector having the approximate right-triangle-shaped mating members.
Figure 8E:
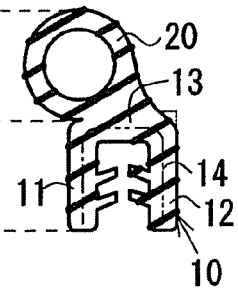
FIG. 8E is a cross-sectional view illustrating the sensor protector designed to be attached to the body, taken along line VIIIE-VIIIE in FIG. 8B.
Figure 8K:
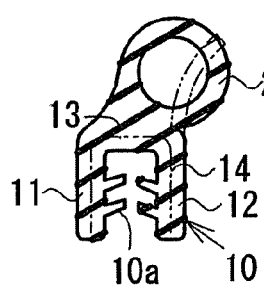
FIG. 8K is a cross-sectional view illustrating the sensor protector designed to be attached to the door, taken along line VIIIK-VIIIK in FIG. 8C.
Figure 8C:
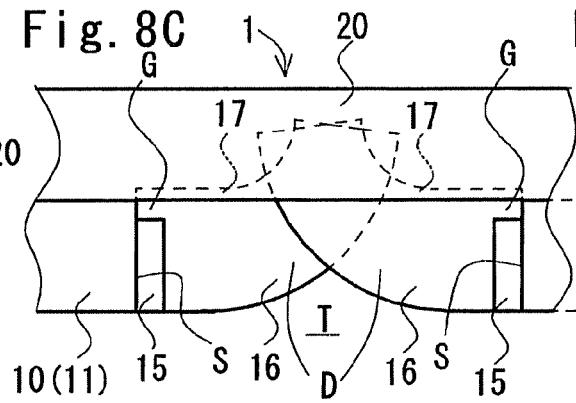
FIG. 8C is a rear view illustrating an invisible rear side of the sensor protector according to the first embodiment of the present invention, in a state before the sensor protector is bent. The sensor protector is designed to be bent so that the radius of curvature of the hollow portion of the sensor protector is smaller than that of the attaching base portion.
Figure 8F:
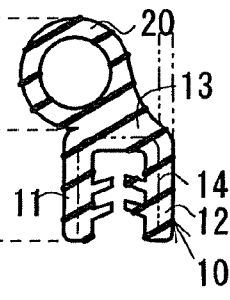
FIG. 8F is a cross-sectional view illustrating the sensor protector designed to be attached to the body, taken along line VIIIF-VIIIF in FIG. 8C.
Figure 9D:
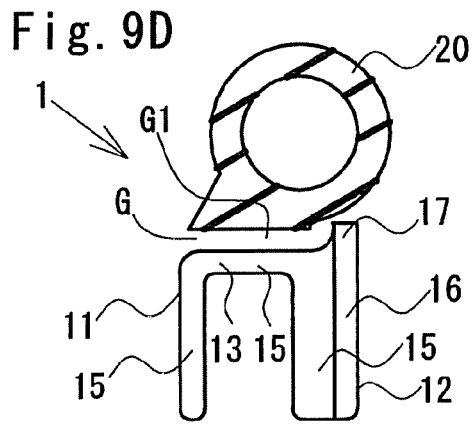
FIG. 9D is a cross-sectional view illustrating the sensor protector designed to be attached to the door, taken along line IXD-IXD in FIG. 7A. A part of the attaching base portion is omitted.
Figure 9A:
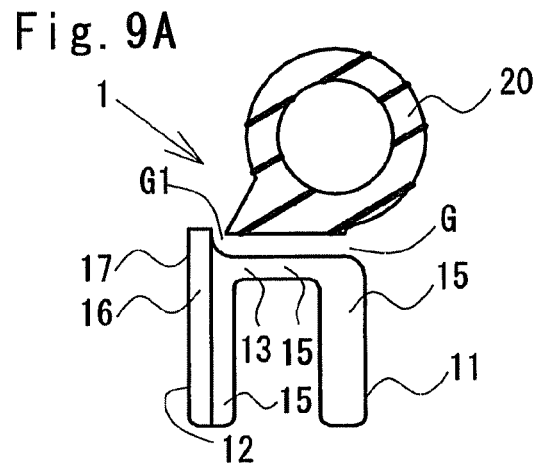
FIG. 9A is a cross-sectional view illustrating the sensor protector designed to be attached to the body, taken along line IXA-IXA in FIG. 7A. A part of the attaching base portion is omitted.
Figure 9E:
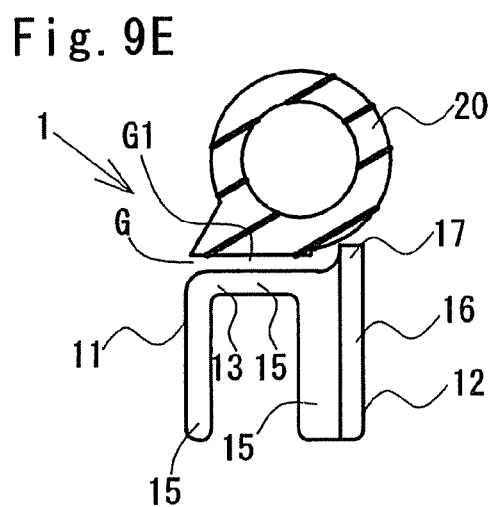
FIG. 9E is a cross-sectional view illustrating the sensor protector designed to be attached to the door, taken along line IXE-IXE in FIG. 7B. A part of the attaching base portion is omitted.
Figure 9B:
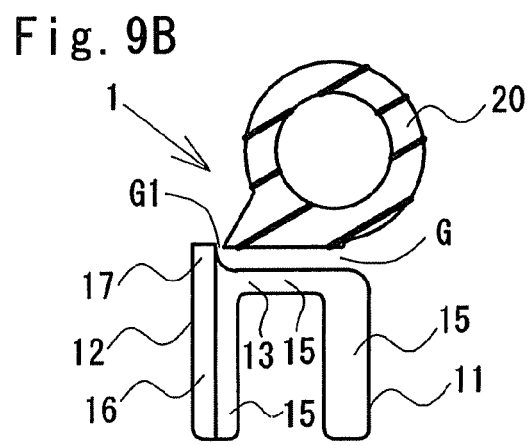
FIG. 9B is a cross-sectional view illustrating the sensor protector designed to be attached to the body, taken along line IXB-IXB in FIG. 7B. A part of the attaching base portion is omitted.
Figure 9F:
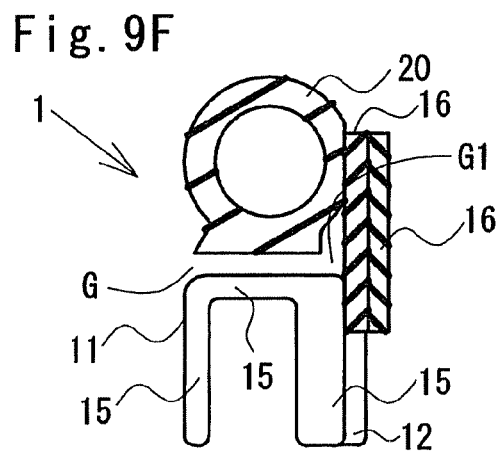
FIG. 9F is a cross-sectional view illustrating the sensor protector designed to be attached to the door, taken along line IXF-IXF in FIG. 7C. A part of the attaching base portion is omitted.
Figure 9C:
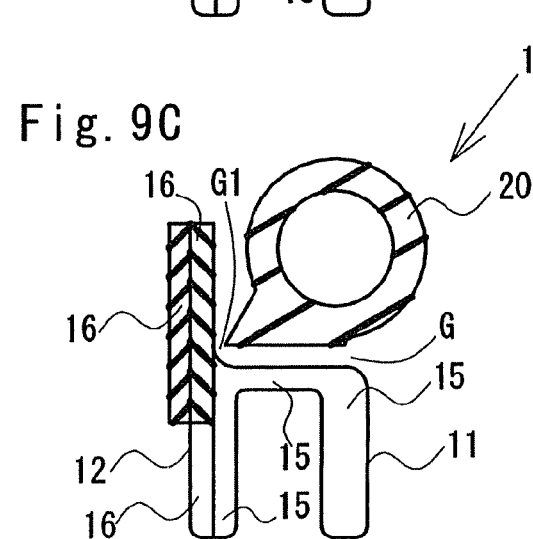
FIG. 9C is a cross-sectional view illustrating the sensor protector designed to be attached to the body, taken along line IXC-IXC in FIG. 7C. A part of the attaching base portion is omitted.
Figure 13A:
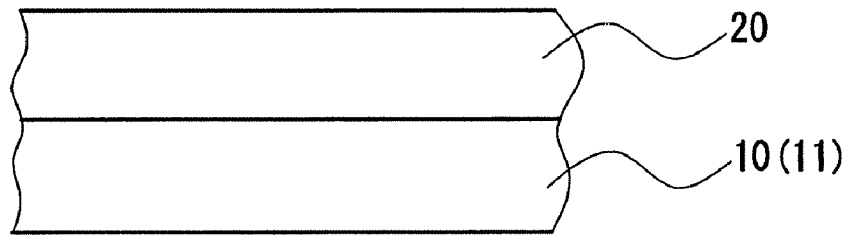
FIGS. 13A to 13D are process diagrams illustrating procedures for making the sensor protector according to the first embodiment.
Figure 13B:
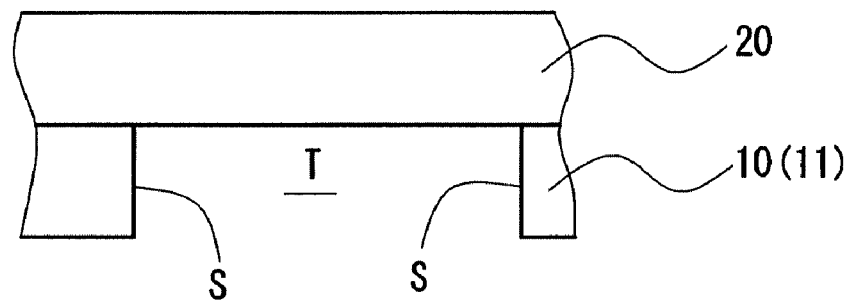
Figure 13C:
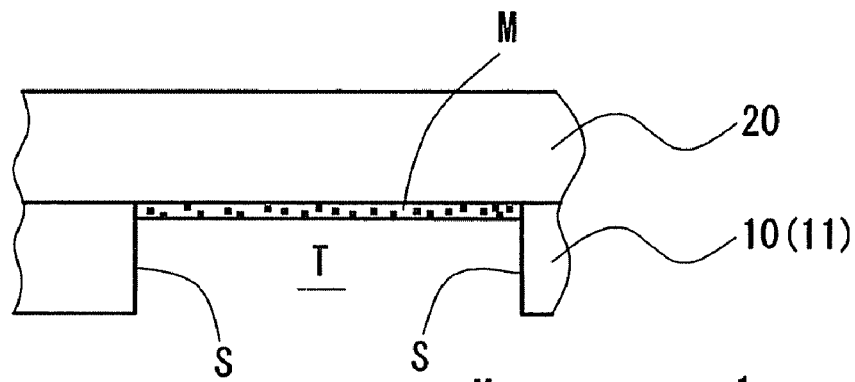
Figure 13D:
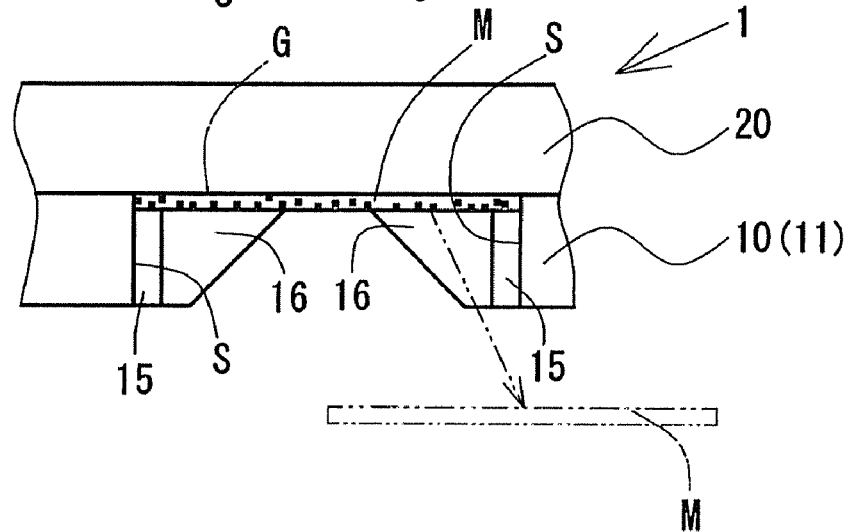

The sensor protector 1 according to the first embodiment can be formed by procedures illustrated in FIGS. 13A to 13D. Firstly, the sensor protector 1 is formed by extrusion (FIG. 13A). Next, a predetermined length of the attaching base portion 10 is cut out rectangularly to form the recessed portion T (FIG. 13B). Next, the core M is inserted in the recessed portion T in the vicinity of the hollow portion 20 (FIG. 13C). Then, the cover portions 15 of a block shape for covering the attaching base portion 10 are formed by molding contiguously with the respective cut surfaces S of the attaching base portion 10. At the same time, the mating plates 16 of an outside of the vehicle 40 and the extended portions 17 are molded to form a unit. Next, the core M is removed (FIG. 13D). The sensor protector 1 is formed by the procedures described above. FIGS. 7A to 7C are front views illustrating the visible front wall 12 side of the sensor protector 1 formed as described above. FIGS. 8A to 8C are rear views illustrating the invisible rear wall 11 side of the sensor protector 1 formed as described above.

A second embodiment of the present invention will be explained with reference to FIGS. 3, 4, 7 to 13. In the second embodiment, the sensor protector 1 is attached to a back door 5 which opens upward. Actions and effects are the same as those of the first embodiment.

A third embodiment of the present invention will be explained with reference to FIGS. 5 to 13. In the third embodiment, the sensor protector 1 is attached to a back door 5 which opens to a right side. Actions and effects are the same as those of the first and second embodiments.

According to the second and third embodiments of the present invention, the extended portion 17 is formed as a unit with the cover portion 15 and the mating plate 16 by molding. The extended portion 17 is formed contiguously with the visible front wall of the cover portion 15 and extends toward the hollow portion 20 from the mating plate 16. The extended portion 17 covers and hides the clearance G. Accordingly, when the sensor protector 1 is attached to the corner portion C, the extended portion 17 inhibits a door panel 5 to be seen by the user through the clearance G between the hollow portion 20 and the cover portion 15 (refer to FIG. 12B). Therefore, appearance can be further improved.

According to the first to third embodiments of the present invention, the sensor protector 1 can be bent easily along the corner portion C even when a radius of curvature (radius of a curve R) of the corner portion C is small. Rusting of the core metal 14 can be prevented. Because the sensor protector 1 is not affected by rust, the sensor protector 1 excels in appearance. Further, because the extended portion 17 covers the clearance G, the extended portion 17 inhibits the door panel 5 to be seen by the user through the clearance G. Accordingly, appearance can be improved. Further, the sensor protector 1 can be bent smoothly along the corner portion C even when the sensor protector 1 is bent toward the attaching base portion 10 to almost the right angle. And at this time also, preferable appearance can be obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sensor protector adapted to be attached to either a body or a door of a vehicle, comprising:
   a hollow portion for accommodating a touch sensor for sensing whether or not an object exists between the body and the door of the vehicle;
   an attaching base portion formed as a unit with the hollow portion and including a core material embedded therein;
   a recessed portion provided at the attaching base portion having a rectangular shape formed by cutting out the attaching base portion;
   plural block-shaped cover portions formed contiguously with respective cut surfaces of the attaching base portion for covering the respective cut surfaces; and
   mating plates provided at two cover portions formed contiguously with respective visible front walls of the attaching base portion, the mating plates having facing mating edges which mate together when the sensor protector is bent.

2. The sensor protector according to claim 1, wherein the sensor protector is adapted to be attached to the body of the vehicle.

3. The sensor protector according to claim 1, wherein the sensor protector is adapted to be attached to the door of the vehicle.

4. The sensor protector according to claim 1, wherein the block-shaped cover portions are formed contiguously with the respective cut surfaces and a clearance is formed between the hollow portion and the block-shaped cover portions by a core inserted in the recessed portion in the vicinity of the hollow portion.

5. The sensor protector according to claim 4, further comprising:
   extended portions formed contiguously with the respective visible front walls of the block-shaped cover portions, the extended portions extending from the mating plates toward the hollow portion for covering and hiding the clearance.

6. The sensor protector according to claim 1, wherein each of the facing mating plates has a trapezoidal shape or a triangular shape and mating edges of the mating plates form a right angle.

* * * * *

UNITED STATES PATENT AND TRADEMARK OFFICE
CERTIFICATE OF CORRECTION

| | | |
|---|---|---|
| PATENT NO. | : 7,812,721 B2 | Page 1 of 1 |
| APPLICATION NO. | : 12/167699 | |
| DATED | : October 12, 2010 | |
| INVENTOR(S) | : Masaru Hoshina et al. | |

It is certified that error appears in the above-identified patent and that said Letters Patent is hereby corrected as shown below:

Title Page, Section (75) Inventors: change "Dalsuke" to --Daisuke--.

Signed and Sealed this
Third Day of May, 2011

David J. Kappos
*Director of the United States Patent and Trademark Office*